2,963,355
PREVENTING SILICA SCALE FORMATION IN SLURRY FEEDING PROCESSES

Roger M. Dille and Ronald W. Chapman, Whittier, Calif., assignor to Texaco Inc., a corporation of Delaware No Drawing. Filed Mar. 13, 1957, Ser. No. 645,656

11 Claims. (Cl. 48—206)

The present invention relates to improvements in the process for treating solid particles such as minerals which involves first forming a flowable mixture of solid particles in a vaporizable liquid, and then passing the mixture through an elongated tubular heating zone while heating the mixture to vaporize the liquid and form a dispersion of solid particles in vapor. Such treating is employed in a recently developed fluid energy grinding process, as described in U.S. Patent 2,735,787, whereby minerals such as coal, talc or feldspar containing leachable calcium and silicon compounds can be disintegrated. It is also employed for feeding to a reaction particles of a solid material containing leachable compounds, e.g. feeding a carbonaceous solid such as coal or oil shale to a synthesis gas generator, as described in U.S. Patent 2,864,677, even with little or no concomitant grinding.

This invention is directed primarily to preventing or reducing the accumulation of silicon compound scale in tubular heating zones during such feeding operations. Such a beneficial result is obtained by incorporating in the flowable mixture of solid particles and vaporizable liquid a magnesium compound. Dissolved scale forming silicon compounds are in this way precipitated as insoluble magnesium-silicon compounds which then pass through the subsequent heating zone as solids instead of precipitating and accumulating on the walls during vaporization.

In the grinding process to which the present improvement relates, after forming a dispersion of solid particles in steam or other vapor as described above, it is passed through a succeeding zone of high velocity flow wherein the flowing stream is subjected to turbulence and a velocity sufficiently high to effect disintegration of the coarse particles. Velocity should exceed 25 feet per second, but is usually much higher, such as hundreds and even thousands of feet per second. This succeeding zone may be a section of pipe, or may include a convergent-divergent nozzle or a pair of opposed jet nozzles. Then the resulting stream containing finely ground solids in suspension is discharged from the high velocity zone. When grinding is the ultimate purpose, the ground product is recovered. When gasification of coal is to be performed, the discharged coal particles are fed to a suitable gasifier for combustion by oxidation of ingredients thereof with resultant synthesis gas generation.

Water will be mentioned as the suspension liquid hereinafter to exemplify the invention. However, other liquids also may be used such as kerosene, alcohols, glycols, tetrachloride and the like.

Much of the development work on the foregoing operations has involved the treating of mineral materials which contain soluble ingredients or impurities tending to form a scale on the internal walls of the heated tubes when liquid is evaporated from the flowable mixture. Among such scale forming ingredients are certain compounds of calcium, aluminum, silicon, sulphur, iron and magnesium, which dissolve in the suspension liquid and later precipitate in the heater tubes when their solubility is exceeded during vaporization of the liquid. Examples are sodium and calcium silicates, and calcium sulfate and bicarbonate.

Scale is detrimental because it causes the tube passages to become so constricted that the velocity rises to a rate high enough to erode through the tube walls. Also, when scale reduces the internal diameter of the tubes it is difficult to maintain constant operating conditions of pressure, velocity, and flow rate during the treating operation. Reduced passage size also imposes overloads on feed pumps, which must operate against excessive back pressures.

Particular difficulty has been experienced when treating talc and coal, both of which may contain sulfur and/or iron compounds, as well as silicious and bicarbonate materials. An examination of the scale in the coal feeding portion of a coal gasifying plant has shown that it is largely a calcium sulfate deposit together with coal, silicates, silica, and compounds of iron and/or aluminum.

An analysis of the scale in a talc grinding plant has indicated that in an initial portion of the tubular zone the scale is almost all calcium sulfate and calcium carbonate, but from there on the proportion of sulfate scale progressively decreases and the proportion of silicious scale increases. Such silicious scale from a talc grinding plant, upon examination, revealed that it was composed of alternating white and grey layers, and that these layers were made up of steatite, grammatite, alpha quartz, alpha cristobalite, and other unknowns. Chemical analysis indicates talc, silicates, silica, iron and/or aluminum.

More in detail in accordance with the present invention, the accumulation of detrimental silica scale on the interior of a heating tube is greatly reduced, and in some cases completely eliminated, by introducing into the flowable mixture of solid particles in water a small quantity of at least one compound of magnesium reactive with the soluble silicon compounds to precipitate a silicon compound from solution, such as selected from the group consisting of oxide, hydroxide, carbonate, nitrate, chloride, and phosphate, with or without other modifying additives. The scale forming silicon compounds are thus precipitated in the slurry tank, probably as magnesium silicate, and flow as solids with the slurry, usually at least partially coating the other solid particles.

Where the flowable mixture also contains soluble calcium compounds, they are concurrently precipitated in the tank and flow as solids with the slurry through the heating tube by introducing into the mixture, along with the magnesium compound, at least one soluble alkali basic compound such as carbonate, or a mixture of hydroxide and bicarbonate reactive with the calcium compounds thereby reducing calcium hardness before vaporization of the liquid. It is to be understood that the term alkali as used herein includes not only the alkali metals of group I (a) of the periodic table such as lithium, sodium and potassium but also includes the ammonium radical which is well known to be equivalent to the alkali metals in many of its properties.

The alkali compounds, particularly sodium hydroxide, complicate the silica scale problem because any excess over that required stoichiometrically to precipitate all of the calcium hardness when bicarbonate is present, tends to leach silica from the mineral and cause it to dissolve as silicate. Consequently, complete scale control requires that enough of the magnesium compound be added to precipitate both the silicate naturally dissolved from the mineral, and the additional silicate resulting from the action of excess alkali compound.

One surprising beneficial result from using a magnesium compound along with an alkali compound is that less of the alkali must be added to reduce the hardness than would be expected from the results when using alkali alone. Such a reduction in the amount of alkali in turn favorably influences the action of the magnesium compound to reduce the amount of soluble silica present. For example, 6.6 lbs. of sodium carbonate per ton of water slurry containing 50% talc by weight reduced the hardness to 16.0 p.p.m. whereas only 4.2 lbs. of sodium carbonate along with 18 lbs. of magnesium oxide per ton reduced the hardness to 7 p.p.m. Furthermore, while the MgO addition remained the same, the silica was lowered to only 2 p.p.m. without increasing the hardness by lowering the sodium carbonate to only 0.75 lb. per ton of water. This beneficial effect of the MgO (which of course hydrates to $Mg(OH)_2$ is probably due to the following reactions involving dissolved silicate:

(1)       (dissolved)       (ppt.)
$$Na_2SiO_3 + Mg(OH)_2 \longrightarrow MgSiO_3 + 2NaOH$$

(2)       (dissolved)
$$NaHCO_3 + NaOH \longrightarrow Na_2CO_3 + H_2O$$

The $Na_2CO_3$ from Equation 2 precipitates the hardness from the water, supplementing the added $Na_2CO_3$.

While beneficial results are obtained no matter how small the addition of magnesium compound, it is desirable to incorporate these materials in amounts sufficient to lower the soluble silicon compound in the slurry filtrate to between 0 and 4 p.p.m. expressed as $SiO_2$. Normally, it is advantageous to incorporate at least ½ pound per ton of water, and at most about 20 pounds per ton. More may be used successfully, although the improvement obtained may not be directly proportional to increase in the quantities of materials above this figure. The dissolved silica in a talc-water slurry was reduced from 100 p.p.m. to 3 p.p.m. using 12.5 pounds of MgO per ton of water. This was much more than the amount required stoichiometrically, the large excess being necessary due to the short retention time in the slurry tank and because reaction is between the soluble silica and the insoluble magnesium compound in the presence of large amounts of solids.

While magnesium nitrate can be used successfully, it generally requires more delicate control than the other relatively insoluble magnesium compounds mentioned. If so much of the water soluble nitrate is added as to provide an excess over the amount required to precipitate the silica, it will remain in solution and will later be deposited in the heater tube as magnesium sulfate scale, which may be as detrimental as silica scale or calcium sulfate scale. Conversely relatively insoluble MgO gives the best results, even precipitating colloidal silica.

One effective way to control the use of a soluble magnesium compound such as nitrate, carbonate, chloride, or phosphate is to react the slurry with excess $Mg(NO_3)_2$ in an amount greater than required stoichiometrically to react with and precipitate substantially all of the soluble silicon compound in one tank constituting a first zone to precipitate the silica as an insoluble silicon compound, and then pass the slurry into a second tank constituting a second zone before feeding it into the heating and vaporizing tubes. In the second tank the pH is raised with alkali such as $Na_2CO_3$ to precipitate excess dissolved magnesium as $Mg(OH)_2$ and the calcium as carbonate. If bicarbonate is present, NaOH also may be used.

For best results, the slurry should be hot, when treated with magnesium compounds preferably above 120° F., to avoid solution which occurs at temperatures below 120° F. Silicate removal improves progressively as the temperature increases above 120° F.

The magnesium and alkali compounds may be added to the slurry in any desired way upstream of the vaporizing zone in a heater tube, but it is simple and otherwise advantageous to introduce these materials directly into the slurry in a supply tank. This may be accomplished by continuously or periodically adding to the slurry either the dry compounds, or concentrated water solutions or slurries of the compounds. Also, the compounds may be mixed together dry, or in water solution or slurry, for addition to the slurry, or they may be added individually.

*Example*

8 pounds of MgO and 1.7 pounds of $Na_2CO_3$ per hour were added to a talc-water slurry containing 50% by weight of coarse talc particles, and maintained at 165–175° F. The water of the slurry had a hardness of only 10–16 p.p.m. expressed as $CaCO_3$ and a soluble silicon content expressed as $SiO_2$ of 2–6 p.p.m., whereas without the additives the hardness is 500 p.p.m. and the $SiO_2$ 81 p.p.m. The slurry was passed at 4 tons per hour and 1100 p.s.i. into a long coil of heated iron pipe wherein the water was vaporized and a dispersion of talc particles in steam was formed at a temperature of 700° F. This dispersion then flowed through a pair of opposed nozzles to grind the talc by impact.

No evidence of scale was observed at the end of 220 hours, whereas ordinarily pressure build-up due to scale accumulation, occurs in 2–20 hours. Subsequent operation of the unit for 100 additional hours occurred with no evidence of scale.

Obviously, many modifications and variations of the invention, as hereinbefore set forth, may be made without departing from the spirit and scope thereof, and therefore only such limitations should be imposed as are indicated in the appended claims.

We claim:

1. In a process for treating particles of a solid material which comprises as an impurity soluble silicon and calcium compounds tending to form a detrimental scale in a tubular heating zone, said process comprising forming a flowable mixture of particles of said solid material in vaporizable liquid, passing said mixture into and through an elongated tubular heating zone, and heating said mixture during passage through said heating zone to vaporize said liquid and form therein a flowing dispersion of solid particles in vapor; the improvement which comprises precipitating a silicon compound from solution by introducing into said flowable mixture upstream of said heating zone a small quantity of at least one magnesium compound reactive with said soluble silicon compound to precipitate a silicon compound from solution, concurrently precipitating soluble calcium compound thereby reducing calcium hardness before vaporization of said liquid by introducing into said flowable mixture an alkali compound reactive with said calcium compound, thus reducing scale formation within said tubular heating zone, and passing the precipitated silicon and calcium compounds through said heating zone along with said flowable mixture.

2. In a process in accordance with claim 1, said magnesium compound being at least one selected from the group consisting of oxide, hydroxide, carbonate, nitrate, chloride, and phosphate.

3. In a process in accordance with claim 1, said magnesium compound being magnesium oxide.

4. In a process in accordance with claim 1, said solid material being selected from the group consisting of coal and talc.

5. In a process in accordance with claim 1, said solid material being talc, and said process including grinding said talc by passing said flowing dispersion in high velocity turbulent flow.

6. In a process in accordance with claim 1, said solid material being carbonaceous material, and said process also comprising feeding said carbonaceous material into a gasification zone, and oxidizing ingredients of said carbonaceous material therein to produce synthesis gas.

7. In a process in accordance with claim 1, said vaporizable liquid being water, and said magnesium compound being introduced in amount up to 20 pounds per ton of water in said flowable mixture.

8. In a process in accordance with claim 1, said liqiud being water.

9. In a process for treating particles of a solid material which comprises as an impurity soluble silicon and calcium compounds tending to form a detrimental scale in a tubular heating zone, said process comprising forming a flowable mixture of particles of said solid material in vaporizable liquid, passing said mixture into and through an elongated tubular heating zone, and heating said mixture during passage through said heating zone to vaporize said liquid and form therein a flowing dispersion of solid particles in vapor; the improvement which comprises precipitating a silicon compound from solution by introducing into said flowable mixture while in a first zone a soluble magnesium compound which is reactive with said soluble silicon compound to precipitate an insoluble silicon compound, said magnesium compound being introduced in an amount greater than required stoichiometrically to react with and precipitate substantially all of said soluble silicon compound, passing said flowable mixture into a second zone, and precipitating out soluble calcium and excess magnesium compounds by introducing into said flowable mixture in said second zone an alkali compound reactive to precipitate excess magnesium compound and to precipitate calcium compound prior to passing said flowable mixture into said tubular heating zone, and passing the precipitated silicon, magnesium, and calcium compounds through said tubular heating zone along with said flowable mixture.

10. In a process in accordance with claim 1, said magnesium and alkali compounds being the only precipitant materials added to said flowable mixture.

11. In a process for treating particles of a solid material which comprises as an impurity soluble silicon and calcium compounds tending to form a detrimental scale in a tubular heating zone, said process comprising forming a flowable mixture of particles of said solid material in vaporizable liquid, passing said mixture into and through an elongated tubular heating zone, and heating said mixture during passage through said heating zone to vaporize said liquid and form therein a flowing dispersion of solid particles in vapor; the improvement which comprises, prior to passing said flowable mixture into said tubular heating zone, precipitating soluble calcium compounds from solution by introducing into said flowable mixture an alkali metal compound in an amount in excess of that required stoichiometrically to precipitate all of said calcium compounds, the excess alkali metal compound acting to leach silica from said solid material, precipitating silicon compound from solution by introducing into said flowable mixture a soluble magnesium compound which is reactive with said soluble silicon compound and the soluble silicon compound leached from said particles by said excess of alkali metal compound to precipitate an insoluble silicon compound, and passing the precipitated silicon and calcium compounds through said tubular heating zone along with said flowable mixture.

References Cited in the file of this patent

UNITED STATES PATENTS

| 1,841,825 | Griegsheim | Jan. 19, 1932 |
| 2,360,730 | Smith | Oct. 14, 1944 |
| 2,735,787 | Eastman | Feb. 21, 1956 |
| 2,830,883 | Eastman | Apr. 15, 1958 |

FOREIGN PATENTS

| 152,285 | Australia | July 13, 1953 |

OTHER REFERENCES

Permutet: Water Conditioning Handbook, TD 430/P4, 1949, pages 17/1 to 17/7.

"Industrial Chemistry," Reigel, 4th edition, Reinhold Publishing Co., TP 145/R54, pages 211 to 214.